March 3, 1970 P. H. SANFORD 3,498,143
INERTIALLY BALANCED LEVER SYSTEM
Filed March 8, 1968 5 Sheets-Sheet 1

INVENTOR.
PHILIP H. SANFORD
BY David E. Hoppe
ATTORNEY

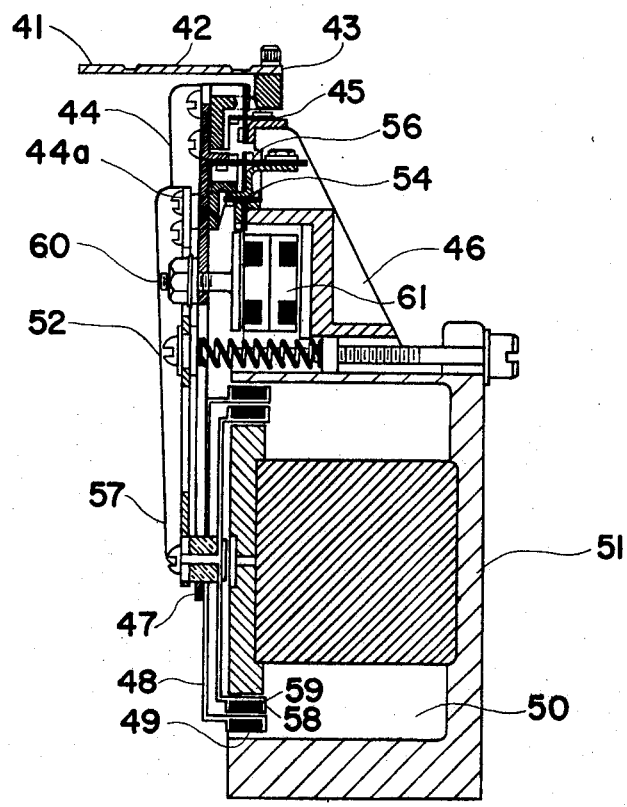
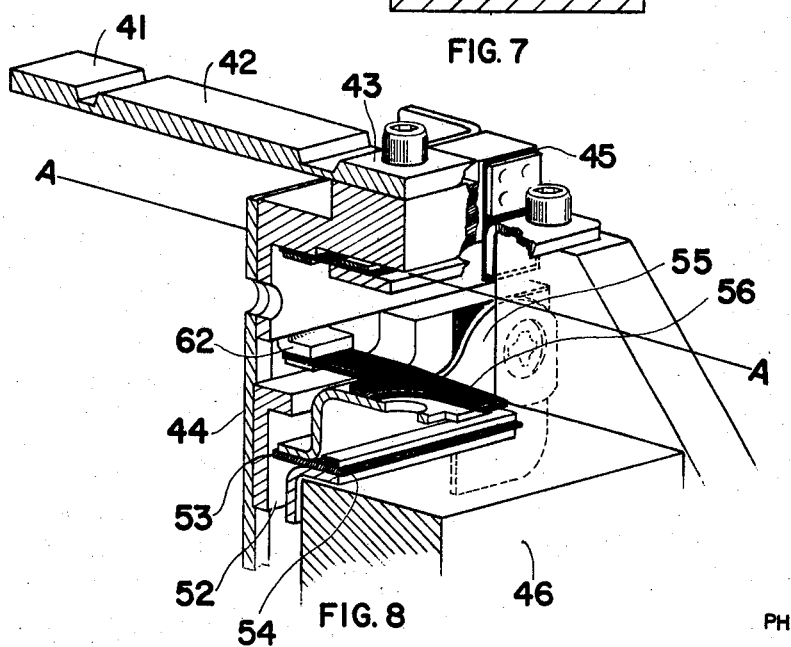

March 3, 1970    P. H. SANFORD    3,498,143
INERTIALLY BALANCED LEVER SYSTEM
Filed March 8, 1968    5 Sheets-Sheet 5

INVENTOR.
PHILIP H SANFORD
BY David E. Hopper
ATTORNEY

United States Patent Office 3,498,143
Patented Mar. 3, 1970

3,498,143
INERTIALLY BALANCED LEVER SYSTEM
Philip H. Sanford, Walpole, Mass., assignor to The Foxboro Company, Foxboro, Mass., a corporation of Massachusetts
Filed Mar. 8, 1968, Ser. No. 711,785
Int. Cl. F16h 37/00
U.S. Cl. 74—1                                                           10 Claims

ABSTRACT OF THE DISCLOSURE

A pair of levers are disposed alongside one another, with a pair of masses respectively attached to said levers in a manner to be positioned closely to one another, the levers being flexibly linked together at points on each lever facing one another, and having respective fulcrums oppositely offset along the lever lengths from the linkage points; by arranging suitable force multiplications in the levers the masses may be made both statically balanced and dynamically balanced with respect to external forces acting similarly upon both masses; a symmetrical arrangement of a pair of such lever systems effectively substitutes for the function of one of the fulcrums of each system; these lever arrangements are useful for applications benefiting from compensation for the effects of a variety of environmental forces.

---

This invention pertains to balanced lever systems, and more particularly to systems adapted to provide for static and dynamic balancing of environmental forces.

Mechanical systems generally may be susceptible to unwanted influences from the environment which may be termed inertial effects. Inertial effects include translational acceleration, rotational velocity, and angular acceleration. Any, or all of these, may be associated with a vibrating environment for a mechanical system. Generally, whenever a piece of commercial hardware is to be employed in a significantly vibrating context, conventional isolating and compensating means are employed therewith to reduce the effects upon the hardware to an acceptable level. For example, mechanical shock-absorbing systems may be employed to isolate the hardware from its mounting; such shock-absorption systems may include elements of mechanical resistance, inductance and capacitance. An additional approach is the use of weight counterbalance, the objective being that of statically balancing the mechanical hardware with the expectation that a statically balanced mechanism will in all probability be the one least affected by an oscillating environment. Other approaches have been employed, such as reducing the inertial mass of the mechanical systems thereby to reduce the effective external forces acting upon the mechanical system. Generally, these various approaches involve a number of design objectives which must be mutually comprised in view of the specification of the over-all system; for example, the inertial mass of the hardware cannot be reduced below that required to adequately sustain the mechanical function. Again, the design of all shock-absorption systems must be contemplated with a view to the anticipated types of forces to be encountered, for instance, the wider the latitude of expected vibrational frequencies, the more complex the design problem.

The present invention provides for means for cancelling inertial effects influencing a mechanical system, employing a lever system providing for an internal static and dynamic balance of the mechanical system.

Briefly stated, the invention employs two levers situated alongside one another, each having mechanical masses attached thereto at the lever ends, the masses preferably disposed in the same line normal to the elongation of the levers, with one lever having a pivot at its end opposite its attached mass while the other lever has a pivot intermediate its end opposite its attached mass; a linkage connects both levers at respective points opposingly offset from their respective pivots; this arrangement provides for a tendency to balance the lever masses statically and dynamically. The degree of balance depends upon the ratio of the respective masses attached to the levers, mutual lever disposition, and the multiplication of forces applied from each lever to the common connecting linkage. Also, the closeness of the two masses to one another in their rest positions affects the dynamic balance for rotational velocity. With this linkage, inertial forces acting upon both lever arms tend to cancel one another in the common linkage.

These and other objects of the invention may readily be apparent from the specification below taken in conjunction with the several figures in which:

FIGURE 7 is a cross-sectional view of the force motor embodiment;

FIGURE 8 is a three-dimensional cross-sectional view of the flexures of the force motor embodiment;

Figure 1:
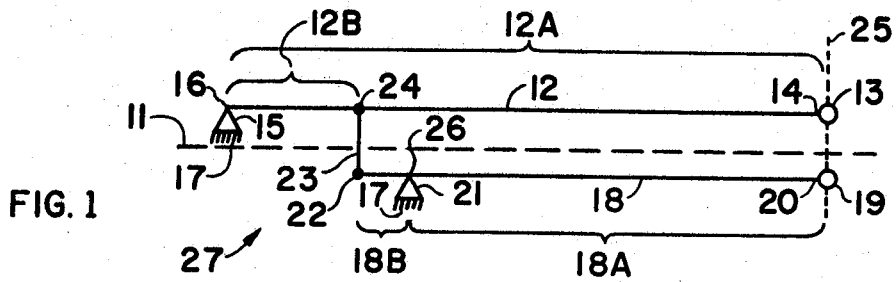
FIGURE 1 is a diagram of the balancing lever system embodying the invention.

Referring to FIGURE 1, illustrating a lever system 27 of the invention, a center line 11 is illustrated for convenience of discussion. Lever 12 is shown disposed on one side and substantially parallel to center line 11. Lever 12 has a mass 13 attached to one of its ends 14 and fulcrum 15 at its other end 16, the fulcrum 15 being fixed with respect to a ground 17. A second lever 18 is disposed substantially parallel to center line 11, on its other side, with a mass 19 attached to its end 20 thereof which is most nearly adjacent end 14 of lever 12 and its attached mass 13. Fulcrum 21 of lever 18 is located intermediate its end 20 and its other end 22. A link 23 flexibly connects end 22 of lever 18 and a point 24 on lever 12 located intermediate its ends 14 and 16. To effectively perform the objectives of the invention it is preferred that the center of gravity of masses 13 and 19, attached to ends 14 and 20 of levers 12 and 18 respectively, lie on a line 25 which is perpendicular to center line 11; that is, masses 13 and 19 should be directly opposite one another. A condition of balance is obtained when the lever lengths and fulcrum positions are calculated to transfer through link 23 equal and opposing forces in response to both gravity and inertial effects. This balanced condition may be obtained when mass 19 multiplied by the length 18A of lever 18 between mass 19 and fulcrum 21, and divided by the length 18B of lever 18 between fulcrum 21 and end 22 has an absolute value equal to mass 13 multiplied by the total length 12A of lever 12, and divided by the length 12B of lever 12 between fulcrum 15 and point 24 thereon. Employing the symbols of FIGURE 1, this relationship can be expressed by the formula:

$$\frac{M19 \times 18A}{18B} = \frac{M13 \times 12A}{12B}$$

That is, the force generated by mass 19 as a consequence of an inertial effect, and as transferred to linkage 23 should have an equal absolute value to the force generated in response to the same inertial effect by mass 13, as transferred to the same linkage 23. When the forces due to an inertial effect upon masses 13 and 19 are equal as appearing in linkage 23, the forces are, by virtue of the leverage arrangement, opposing one another and thereby tend to cancel; the lever system and its attached masses are thus substantially uninfluenced by the inertial effect, not being displaced thereby. This stability can be obtained for various configurations of the lever system, so long as the formula specified above is observed. That is, the masses may be unequal if the lever lengths between the masses and the fulcrums are altered in accordance with the above formula so that the forces transmitted to linkage 23 remain equal in response to an inertial effect. To obtain a particular ratio of fulcrum advantage for each lever 12 and 18, and also conveniently link the levers together at mutually opposing points 22 and 24 by linkage 23, it may be observed that fulcrums 15 and 21 must be offset from linkage 23.

Generally, it is found that when the lever system and its attached masses are statically balanced, that is, with respect to gravitational forces, the lever system is also thereby at its best balance for cancellation of applied inertial forces.

The lever system design may be first formulated upon the base of the weight ratio of the respective masses and the length of the various sections of the lever system; in practice, the levers and linkage themselves will also represent some mass so that static balancing of the lever system should also take into account the lever weights. However, the masses of the levers themselves exhibit some tendency to cancel inertial effects by virtue of the lever system arrangement of the invention. To the extent that complete dynamic balancing may not be achieved for the levers themselves, the lever masses and the consequent inertial effects involved may be considered not significant considering the masses fixed at the lever ends.

Figure 2:
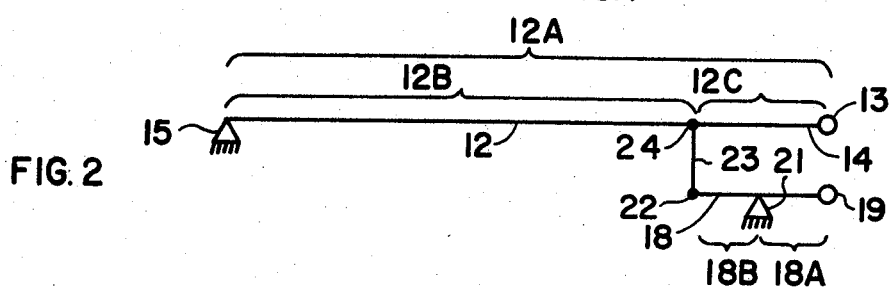
FIGURE 2 is a diagram of a balancing lever system employing substantially one-to-one lever ratios.

If a pair of levers employed with equal masses were each to have a 1-to-1 ratio, a lever ararngement for substantially achieving such a ratio is illustrated in FIGURE 2. For lever 18 to have a 1-to-1 ratio, section 18B is made equal in length to 18A; thereby, a force impressed upon mass 19 would appear equal and opposite as appearing at linkage 23. For lever 12 to have a substantially 1-to-1 ratio, length 12B should be of a length a very large multiple that of the length 12C between point 24 and end 14 of lever 12. That is, the difference between the length 12A, the entire lever length, and the length 12B should be insignificant in terms of the dimensions of the lever system; for this arrangement, a force impressed upon mass 13 would appear at linkage 23 significantly unchanged. Of course, for a precise 1-to-1 leverage function for lever 12, fulcrum 15 would have to be located an infinite distance from mass 13; since length 12B must be limited, a perfect 1-to-1 ratio is not obtainable in the lever system in FIGURE 2.

Figure 3:
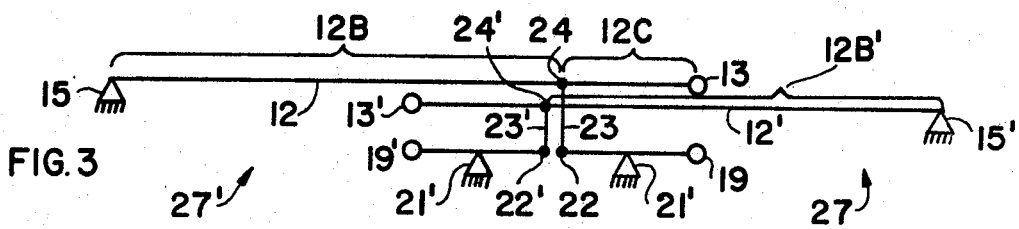
FIGURE 3 is a diagram of a symmetrically arranged pair of one-to-one lever systems.
Figure 4:
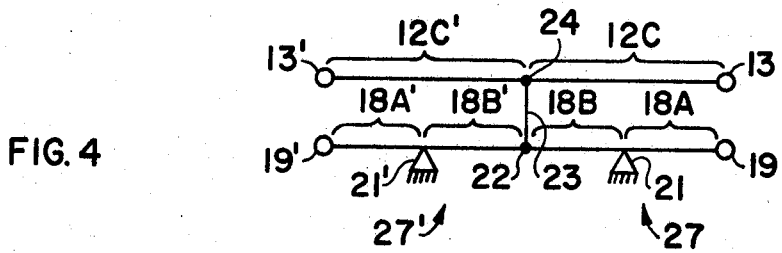
FIGURE 4 is a diagram of a symmetrical one-to-one lever system employing only a single fulcrum for each side of the symmetrical configuration.

Two of the 1-to-1 lever systems illustrated in FIGURE 2 are shown as lever systems 27 and 27' in FIGURE 3 symmetrically disposed with the long lever lengths 12B and 12B' extended in opposite directions and with links 23 and 23' disposed alongside one another. In such a symmetrical arrangement it may be observed that links 23 and 23' respond similarly to the imposition upon masses 13, 13', 19 and 19' of an inertial force. Lever system 27 and lever system 27' may be connected together on their links 23 and 23' so that points 22 and 22' are joined and points 24 and 24' are also joined; such a coupled lever system 27–27' will function in much the same manner as when separated, except to the extent lever lengths 12B and 12B' are not infinite. Now, if masses 13 and 13' are representative cross sections of a single first mass, such as a ring, and the masses 19 and 19' are representative cross sections of a single second mass, such as a ring, and if ring mass 13–13' and ring mass 19–19' are constrained to move along their mutual axes with the planes of the rings always parallel, then extended lever lengths 12B and 12B' along with fulcrums 15 and 15' may be removed, leaving the symmetrical system of FIGURE 4. That is, each identical half of the symmetrical combined lever system now fulfills the function of the former fulcrum 15–15' for the other half. Note that in the combined system of FIGURE 4, an exact 1-to-1 lever arrangement is now achieved; this may be readily seen from the fact that any displacement of mass 13–13' will result in an exactly identical displacement of point 24. That is, forces impressed upon masses 13–13' are transferred to link 23 unchanged by any linkage multiplication.

Since the lever lengths themselves, as well as the respective masses, are symmetrically arranged, the effects of the masses of the lever lengths themselves will exhibit a mutual cancelling of rotational acceleration. This results from the effective lever masses being symmetrical about link 23, and for reasons similar to the cancellation of rotational acceleration in masses 13 and 19, discussed next.

Figure 5:
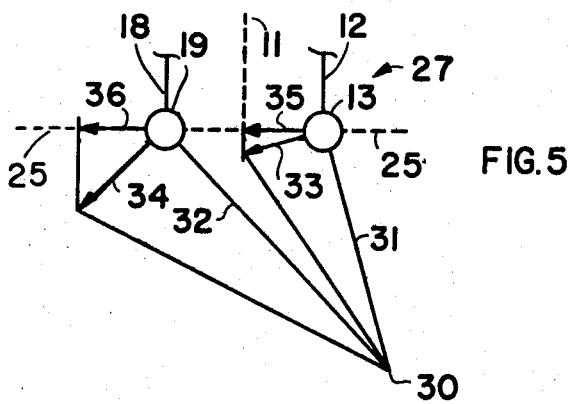
FIGURE 5 is a diagram illustrating the vectorial resolution of rotational acceleration upon two separated masses of a lever system.

In FIGURE 5 masses 13 and 19 of the simple lever system referred to above in connection with FIGURE 1 are illustrated for the purpose of analyzing the effects of rotational acceleration upon the lever system. If, for example, the lever system 27 is in its entirety accelerated about an arbitrary point 30, the effects of such rotational accelerational effects upon masses 13 and 19 may be analyzed by means of vectors. It is assumed that masses 13 and 19 are equal. Also, masses 13 and 19 lie on the same line 25 normal to their parallelism; that is, masses 13 and 19 are the same distance from linkage 23. Mass 13 is located at a radius 31 from point 30. Mass 19 is located at a greater radius 32 from point 30. The inertial effects of rotational acceleration increase proportionally with the radius of the mass from the center of rotation. The respective accelerational effects upon masses 13 and 19 are represented respectively by lengths 33 and 34 in directions tangent to the rotational path of each mass. Mass 19 exhibits the same ratio between its radius and accelerational effect as does mass 13. The next step is to ascertain the vectorial inertial effect along the direction of line 25 resulting from inertial effects 33 and 34 respectively. Vector 35 for mass 13 and vector 36 for mass 19 along line 25 are resolved from the direction of the mass acceleration effects 33 and 34. It will be observed that for all cases, vectorial resultants 35 and 36 in the direction of line 25 are always equal. That is to say, rotational acceleration upon the lever system, about some point 30, tends to produce equal inertial effects upon the respective masses on a tangent common to both their paths of free movement (line 25). The lever system of FIGURE 1 will tend to cancel the effects of any rotational acceleration upon the lever system as long as masses 13 and 19 are located on the same line 25, although masses 13 and 19 may be separated by some finite distance.

The simpler cases of self-cancellation of static forces (gravity) and translational inertial forces (simple acceleration) will be readily apparent. For the case of rotational velocity, the inertial force will be impressed upon the masses outboard of the direction of mass travel. In this case of rotational velocity, to the extent masses 13 and 19 do not have their centers of gravity coincident at some point in space, there will be a tendency for some inertial imbalance upon the lever system 27. The effects of rotational velocity may be minimized by placing masses 13 and 19 as close together as practicable; in addition, these effects may be cancelled in the lever system by employing mass configurations such as interlocking shapes, wherein for the rest position the center of gravity of masses 13 and 19 may be made to be coincident. For the mass-coincident condition, the effects of rotational velocity upon both masses will then be cancelled by the lever system; thus dynamic balance for all inertial forces as well as static conditions may be obtained.

Figure 6:
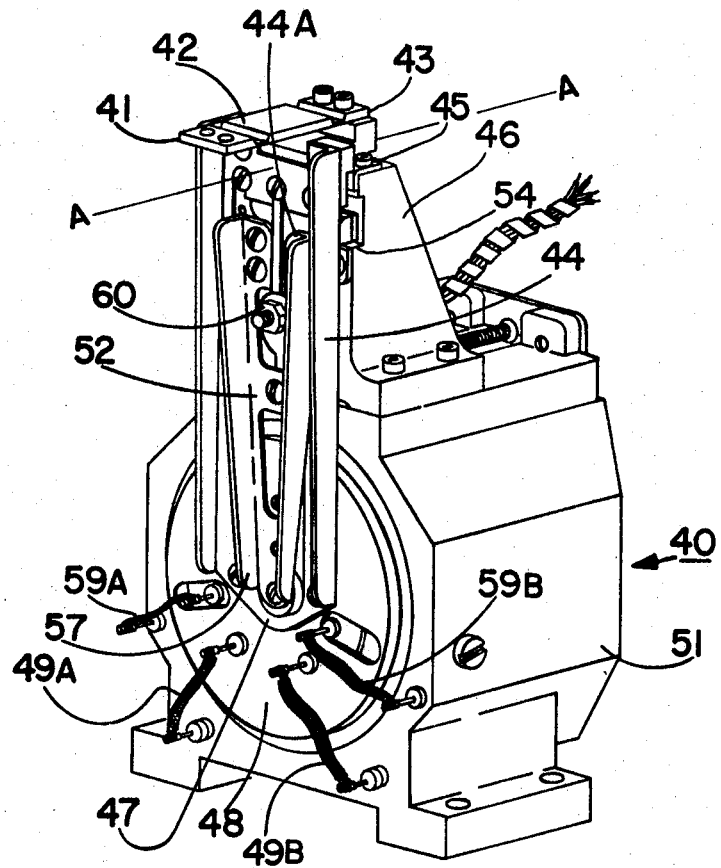
FIGURE 6 is a three-dimensional view of a force motor embodying the lever system of the invention.

Referring to FIGURE 6, an illustrative application of the invention is depicted in the form of a force motor 40. In such a device, a force derived from a transducer (not shown), for example a differential pressure sensing cell, is applied to input end 41 of flexure 42 to end 43 of lever arm 44. Lever arm 44 is pivoted on extension support 46 by means of cross flexure 45, which is more readily located in the views of FIGURES 7 and 8. Lever arm 44 supports at its lower end 47 a cup-shaped mass 48 carrying a voice coil 49.

The application of a force from a transducer through flexure 42 to top end 43 of lever arm 44 tends to pivot the lever arm about cross flexure 45 and thereby displace voice coil 49 inwardly or outwardly with respect to inner annular concavity 50 of housing 51. The function of lever arm 44 generally corresponds to the function of lever 12 as discussed above, with a lever extension to the other side of the pivot 15 to provide for the application of an external transducer-derived force to the lever system.

A second lever arm 52 is disposed generally in line with lever arm 44, lever arm 52 being substantially located in a cut out 44A within lever arm 44. Lever arm 52 is pivoted at a point 53 near its upper end 55 by means of cross flexure 54 to extension support 46. The function of lever arm 52 is analogous to the function of lever 18 discussed above.

Above flexure pivot 54, end 55 of lever arm 52 is coupled by linking flexure 56 to lever arm 44 at a point 62 intermediate pivot points 45 and 54. Linkage 56 functionally corresponds to linkage 23 as discussed above. Cross flexure 54 corresponds to pivot 21 and cross flexure 45 corresponds to pivot 15. Refer to the view of FIGURE 8 for a detail showing.

At the lower end 57 of lever arm 52, a second cup-shaped form 58 carries a second voice coil 59 inboard of voice coil 49. This arrangement of voice coils 49 and 59 tends to make the center of the masses suspended by lever arms 52 and 44 coincident, thereby providing for an optimum dynamic balance for the leverage system.

In operation, lever arm 44 in response to a force from a transducer through flexure 42, pivots about flexure 45 displacing its lower end 47, and also via flexure linkage 56, tends to move lever arm 52 at its extreme upper end 55. Lever arm 52 thereby pivots about across flexure 54 displacing its lower end 57 and its voice coil 59 in a direction opposing the movement of voice coil 49 carried by lever arm 44. In this manner, an input force operates to displace voice coils 49 and 59 in a mutually opposing manner. The force motor components are force balanced to a null position in a manner described in patent application 681,714 filed Nov. 9, 1967. Thus voice coils 49 and 59 are substantially maintained in the same positions by the force balance arrangement, with the balancing currents, supplied thereto in a manner to produce mutually opposing forces therein.

The application of inertial forces to force motor structure 40, results in the cancellation of inertial effects by cross linkage flexure 56, in the same manner as described above in connection with linkage 23. Voice coils 49 and 59 together with forms 48 and 58 generally correspond to masses 13 and 19, wherein an inertial effect acting similarly upon both masses is coupled back through lever arms 44 and 52, and in combination with the pivoting and cross linkage arrangement thereby provides for a mutual cancellation of the inertia effect. Design of force motor 40, with its lever arms and voice coils, takes into account the relative proportions of the leverage system and the masses it supports, as described above.

Figure 9:
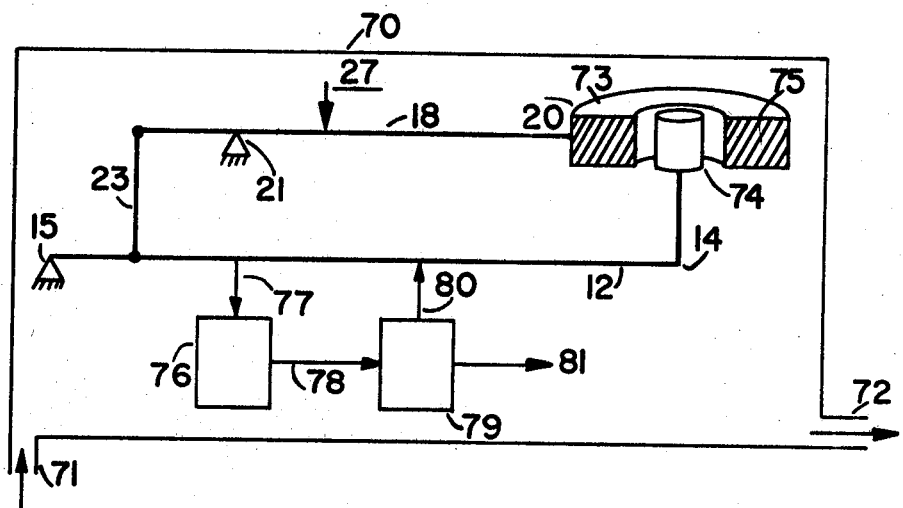
FIGURE 9 is a schematic representation of a buoyancy gas density measuring apparatus embodying the lever system of the invention.

Referring to FIGURE 9, a schematic representation of an embodiment of the lever system of the invention for measuring the density of a gas, a pressure tight container 70 has a gas inlet 71 and a gas outlet 72. Located within container 70 is a leverage arrangement generally indicated at 27 combined with means for sensing the buoyancy of surrounding fluid comprising a float 73 attached to end 20 of lever 18, and a counter-balance 74 attached to end 14 of lever 12. Float 73 conveniently is substantially exhausted to a vacuum at its interior 75. Counter-balance 74 conveniently has a mass equal to that of float 73. The arrangement of the float 73 surrounding the counter-balance 74 determines a center of gravity for both float 73 and counter-balance 74 on substantially the same point, which is an optimum arrangement for the cancellation of inertial effects. A detector 76 is responsive to the movement of lever 12 at a convenient point 77 and provides an output 78 related to the displacement of lever 12 from its null postion to motor 79 which operates to force rebalance lever 12 to its null position by the application of force to a convenient point 80 of lever 12. In operation, a gas admitted into container 70 determines a buoyancy effect upon float 73. The density of the gas in container 70 provides a related degree of buoyancy tending to move float 73 and its attached lever 18 upwards. The leverage system in response to the tendency of an upward movement of float 73 operates to provide a related tendency to displace counter-balance 74 downward, which tendency for displacement is sensed by detector 76. The force produced by motor 79 employed to rebalance lever 12 to its null position is proportional to the buoyancy effect on float 73 and thus proportional to the density of the gas in container 70. An output 71 may be taken from motor 79 derived from the rebalancing force, and is thus an indication of the density of the fluid in container 70.

By the inertial force-cancelling function of the lever arrangement 27, the apparatus within container 70 is rendered relatively immune to the effects of inertial forces. That is, environmental effects tending to disrupt the measuring function of the apparatus are effectively cancelled thereby providing for a more stable and reliable output signal 81, as well as improved sensitivity of the apparatus.

Figure 10:
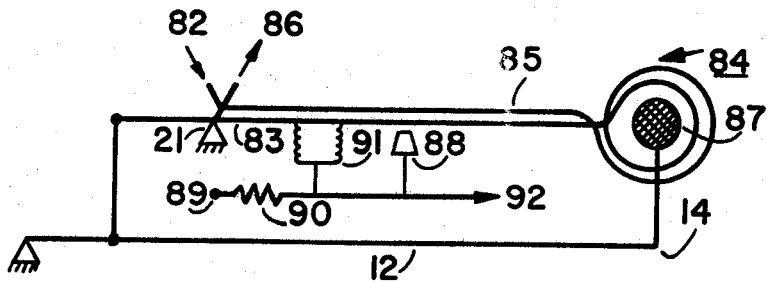
FIGURE 10 is a schematic representation of apparatus for weighing a portion of a fluid flow embodying the invention.

Referring to FIGURE 10, apparatus is schematically represented for weighing a fluid flow provided to an inlet 82 located at fulcrum 21, which flows through conduit 83 to and through the coil indicated at 84 and back through conduit 85 to fulcrum 21 and outlet 86. Conduits 83 and 85 provide the function of lever 18, and the coil at 84 corresponds to the effective mass located at the lever end. At end 14 of lever 12 is attached a counter-balance 87, which conveniently has the same mass as the coil arrangement at 84. Fluid passing through conduits 83 and 85 and coil 84 tends to affect the weight thereof, and displace the conduit-coil system 83, 85 and 84, which displacement is sensed by nozzle 88. Nozzle 88 in combination with a conduit 83 (or 85), operates in a conventional flapper-nozzle manner; the pressure at the nozzle is derived from a pneumatic source 89 through a restrictor 90, and is related to the distance of conduit 83 (or 85) from nozzle 88. This pressure is communicated to bellows 91 to force rebalance the configuration of conduits 83, 85 and coil 84 to their null position. The force required to maintain the null position by bellows 91 is proportional to the air pressure therein, which is available at 92 as an output of the system. It is found that the force balance required, as read at output 92, will be proportional to the weight of the fluid in conduits 83, 85 and coil 84.

Figure 12:
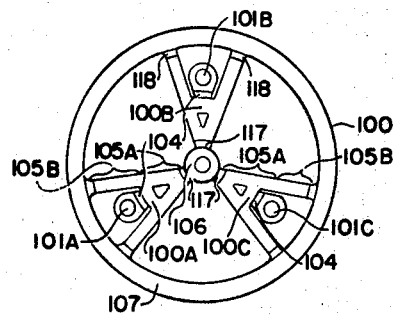
FIGURE 12 is a plain view of the spider flexure.
Figure 11:
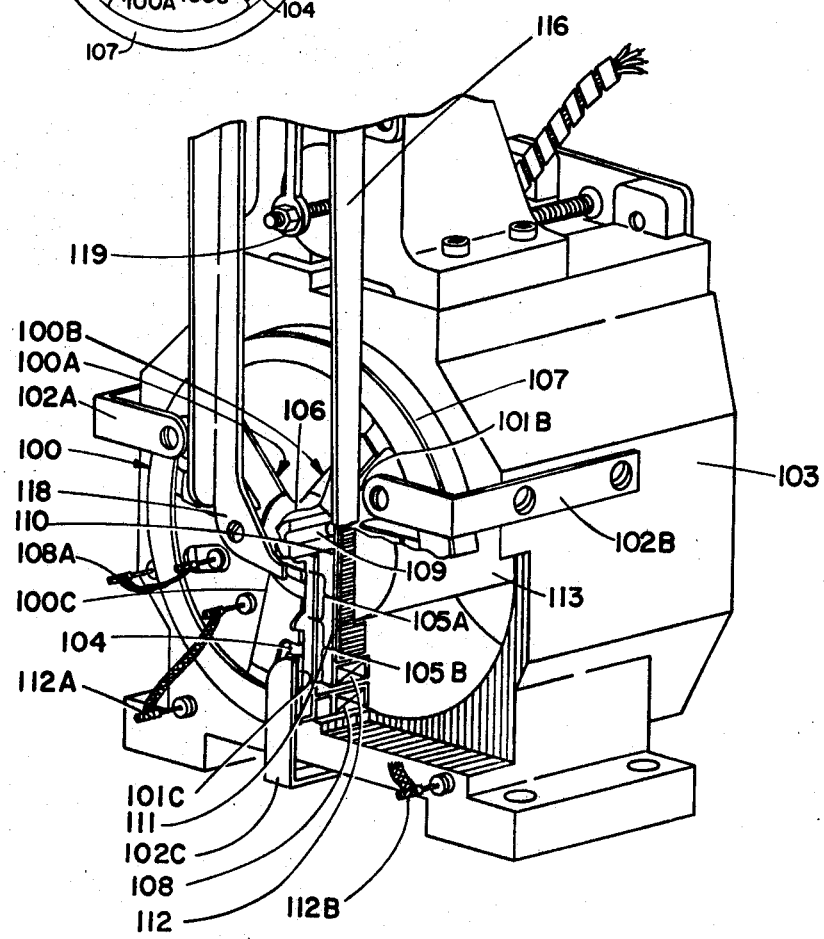
FIGURE 11 is a three-dimensional cut-away of a second force motor embodiment employing a spider flexure leverage configuration.

Referring to FIGURE 11, a three-dimensional cut-away view of a symmetrical 1-to-1 lever embodiment of the invention is illustrated, employed in a force motor type of application. A spider generally indicated at 100, conveniently has three legs 100A, B, C; these legs are arranged symmetrically, each performing the function of the lever 18 and fulcrum 21, discussed above. Spider 100 is mounted by its tabs 101A, B, C on support arms 102A, B, C respectively, which support arms are in turn fixed to motor housing 103, thereby providing a 3-point supporting arrangement for spider 100. Each spider tab 101 has a flexure point 104 which performs the function of pivot 21 in the symmetrical 1-to-1 lever configuration discussed above. Disposed on either side of a respective flexure point 104, each spider leg 100A, B, C is subdivided into sections 105A and 105B, corresponding to the lever sub-divisions 18A and 18B discussed above. Thereby, each spider leg 100A, B, C is pivoted about flexure points 104 to thereby carry the hub 106 and the rim 107 of spider 100 in mutually reciprocating levered movement. Rim 107 of spider 100 carries voice coil 108, and hub 106 of spider 100 carries a spacer 109. Spacer 109 generally corresponds to linking means 23 discussed above, and voice coil 108 generally corresponds to mass 13 discussed above. Spacer 109 mechanically links hub 106 of spider 100 to the center of a disc 111. Disc 111 is substantially rigid throughout and carries at its circumference voice coil 112. Voice coil 112 is disposed inwardly concentric with voice coil 108. Disc 111 and its voice coil 112 are effectively supported by spacer 109, which has a finite cross-sectional diameter rigidly mounted the central region of disc 111. The other end of spacer 109 is in turn supported by hub 106 of spider 100. Flexures 117, seen in FIGURE 12, attach each leg 100A, B, C to hub 106 so that the spider 100 may generally pivot on its three flexures 104. This arrangement constrains spider hub 106 and the entirety of disc 111 to remain parallel while spider legs 100A, B, C pivot at points 104 permitting the relative movement of voice coils 108 and 112. Disc 111 corresponds to lever portions 12C and 12C' discussed in connection with the symmetrical 1-to-1 lever arrangement above. The cross-sectional diameter of spacer 109 in combination with the three-legged support of spider hub 106 performs the function of stabilizing the relationship of spider 100 with disc 111, so that the planes of voice coils 108 and 112 remain parallel to one another.

A force may be applied from a transducer, not shown, to force bar 116. The lower end 118 of force bar 116 is attached to the hub 106 of spider 100. The application of a force through force bar 116 operates to move the hub 106 of spider 100 inwardly or outwardly from housing 103, the hub 106 carrying spacer 109 and disc 111 therewith. Voice coil 108 at the rim 107 of spider 100 is reciprocatingly levered with the motion of force bar 116, by virtue of the flexure points 104 upon which the spider legs 100A, B, C are pivoted; voice coil 112 moves in the same direction as force bar 116. In operation, a detector 119 senses displacement of force bar 116 from its null position and transfers a signal through associated apparatus (not shown) which in turn applies a signal to terminals 112A, B and 108A, B of voice coils 108 and 112 in a manner to restore the voice coils and their associated components to their null position. Inwardly concentric magnetic structure 113 aids in this function, with the signal to coils 108 and 112 being applied in a manner to produce mutually opposing forces therein.

This symmetrical lever configuration of the invention provides for the cancellation of inertial effects applied to the masses carried by the spider 100 and disc 111 respectively. Thus, it may be seen that force motor embodiment of FIGURE 11 may be operated in any position, and subjected to a variety of inertial effects.

Modifications of the arrangement of FIGURE 11 may readily be employed, such as substituting a conventional bellows (not shown) for force bar 116, positioned to directly apply force to hub 106 and spacer 109 of spider 100. A conventional flapper-nozzle arrangement may also be employed therewith (not shown) instead of detector 119 to detect the movement of hub 106 in response to the bellows-applied pressure. With this configuration of bellows and nozzle substituted for force bar 116, and detector 119, a rebalancing function may be performed in which some transducer-derived signal applied to the voice coils will cause the standard bellows-nozzle arrangement to rebalance voice coils 108 and 112 to their null position by a suitable air pressure in the bellows. This air pressure is proportional to the applied voice coil signal. Thus, this arrangement will translate a transducer-derived current, applied to the voice coils, into a corresponding air-pressure, which may be conveniently taken from the source feeding the bellows, such as a conventional pneumatic relay. It will be readily apparent that many other applications of the invention may be used.

Applications of the invention are particularly useful in those situations where the ratio of the required mechanical mass to the available signal is quite large. That is, when the signal deviation, for example, is very small, the invention may advantageously be used to provide for a relative insensitivity from inertial effects for the mechanical masses employed in the system; the density and weighing embodiments discussed above employ extremely small signals which benefit from the provision of inertial insensitivity. Otherwise, such applications may readily have the available small signals swamped out by external disturbances.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A balanced lever system for cancelling the effects of inertial forces acting thereon comprising, a first lever having a first mass and a first linkage point and with a first fulcrum at an intermediate position between said first mass and said first linkage point, a second lever having a second mass and a second linkage point and with an effective second fulcrum for said second lever displaced from said second mass with said second linkage point being intermediate said effective second fulcrum and said second mass, and linking means interconnecting said first and second linkage points, whereby inertial forces appearing at said first and second masses are coupled to said linking means and tend to cancel.

2. The lever system of claim 1 wherein the ratio of said first mass times the effective first lever length between said first mass and said first fulcrum point divided by the effective first lever length between said first fulcrum point and said first linkage point, to:

said second mass times the effective second lever length between said second mass and said second fulcrum divided by the effective second lever length between said second fulcrum and said second linkage point, provides for lever system balance to the extent the ratio is unity.

3. The lever system of claim 1 wherein said first and second masses have their centers substantially located on a line perpendicular to the length of said first and second levers.

4. The lever system of claim 1 wherein the centers of gravity of said first and second masses are made to be substantially coincident.

5. The lever system of claim 1 wherein said first and second linkage points are substantially positioned opposite one another.

6. The lever system of claim 1 in a force balance application wherein components corresponding to said first and second masses are constrained to a null balance position with position-sensing means for modifying the constraining force.

7. The lever system of claim 1 in a fluid density application wherein a member responsive to the buoyancy of a fluid and a counter-balance are carried by said lever system said member and said counter-balance corresponding to said first and second masses.

8. The lever system of claim 1 in a fluid weighing system in which a fluid conduit and a counter-balance correspond to said first and second masses.

9. In a mechanical system carrying inertially balanced masses, a spider having a plurality of legs each carrying the spider rim at its outer portion and each flexibly supporting the spider hub at its inward portion, and each leg having a flexured pivoting point approximately midway between spider rim and hub, thereby carrying the spider rim and hub in mutually reciprocating motion about said flexure points, with the spider hub adapted to carry in rigid relationship thereto a second mass in an inertially balanced relationship with a mass carried at said spider rim.

10. A balanced mechanical system for cancelling the effects of inertial forces acting thereon comprising:

a mechanical configuration having a plurality of levers each lever carrying a first mass at each outer end thereof and each lever being flexibly interconnected to one another at each inner end thereof and each lever having a fulcrum point intermediate outer and inner ends thereof, thereby carrying said outer ends of said levers and said inner ends of said levers in mutually reciprocating motion about said fulcrum points, linking means interconnected with said inner ends of said levers, and a second mass rigidly carried by said linking means in an inertially balanced relationship with said first mass.

References Cited
UNITED STATES PATENTS

| | | | |
|---|---|---|---|
| 2,345,281 | 3/1944 | Morse | 74—1 |
| 2,935,870 | 5/1960 | Lyons. | |
| 2,944,432 | 7/1960 | Rintoul et al. | |

MILTON KAUFMAN, Primary Examiner

U.S. Cl. X.R.

73—432; 74—469